United States Patent [19]

Shipman et al.

[11] 4,032,230

[45] June 28, 1977

[54] HIGH SPEED MICROFILM SEARCHING SYSTEM

[75] Inventors: Matthew Shipman, New York; Richard Hess, Rye; Burton Kaufman, New York; Bruce H. Schneider, Douglaston, all of N.Y.

[73] Assignee: General Computing Corporation, New York, N.Y.

[22] Filed: July 21, 1975

[21] Appl. No.: 597,766

Related U.S. Application Data

[63] Continuation-in-part of Ser. No. 441,049, Feb. 11, 1974, Pat. No. 3,895,865.

[52] U.S. Cl. .................... 355/42; 235/61.11 F; 235/61.12 M; 250/561; 250/568; 353/26 A
[51] Int. Cl.² ........................................ G03B 27/52
[58] Field of Search ............................ 355/40–43, 355/68, 70, 64, 65, 20; 178/6.6 A, 6.6 R, 6.7 A, 6.7 R; 353/26 A, 25; 250/566, 561, 568, 555; 235/61.11 E, 61.11 F, 61.11 G, 61.12 R, 61.12 M, 61.7; 346/107 R, 107 A

[56] References Cited

UNITED STATES PATENTS

| | | | |
|---|---|---|---|
| 3,262,355 | 7/1966 | Kleist et al. | 355/41 X |
| 3,322,030 | 5/1967 | Silverman | 355/41 X |
| 3,600,089 | 8/1971 | Walter | 355/41 X |
| 3,677,465 | 7/1972 | Johnson et al. | 355/41 X |
| 3,772,465 | 11/1973 | Vlahos | 355/40 X |
| 3,796,487 | 3/1974 | Voorhees | 355/20 X |
| 3,801,201 | 4/1974 | Greenblatt | 355/40 |

Primary Examiner—Richard A. Wintercorn
Attorney, Agent, or Firm—Yuter & Rosen

[57] ABSTRACT

A high speed microfilm searching system is disclosed. The system optically displays frames of the microfilm. A frame or column of microfilm is made up of a sensor mark, pages of information and an index code. The index code is a meaningful alphanumeric or numeric key that accompanies each page or column. If it is alphabetic it varies in strict alphabetic sequence. If the components of the key are numeric they vary in an increasing or decreasing order. Microfilm projecting means mounted in the filmpath between feed and take-up reels clearly display on a viewing screen a page of information when the microfilm is stationary in accordance with existing technology. The high speed search system is new technology. A strobe lamp displays indexes of the moving microfilm on a screen. Each of the frames having an index of digital form and also has an optically detectable marker. The marker is placed in a fixed position with respect to the digit positions of the index to insure accurate strobing without the need for masks or shutters. Electronic control means is optically responsive to each marker to generate a marker signal which can trigger the strobe and display the index of that page, like a movie picture. At very low microfilm retrieval speeds each character of the index is legible so that all of the characters of the index can be read by the user. At increasingly high retrieval speeds only more significant characters can be read because of the rapid change of the low order characters. At the increasingly higher speeds the electronic control means may be only responsive to every second, third, fourth, etc. marker signal. As the desired index comes into range, whether going forward or backward, the viewer operator slows the speed of the microfilm so that more of the characters of the index can be read. When the desired index is very close, the film is moved very slowly so that all of the characters of each index can be read. This film is then stopped on the desired frame so that the contents of the page can be read on the viewing screen.

12 Claims, 7 Drawing Figures

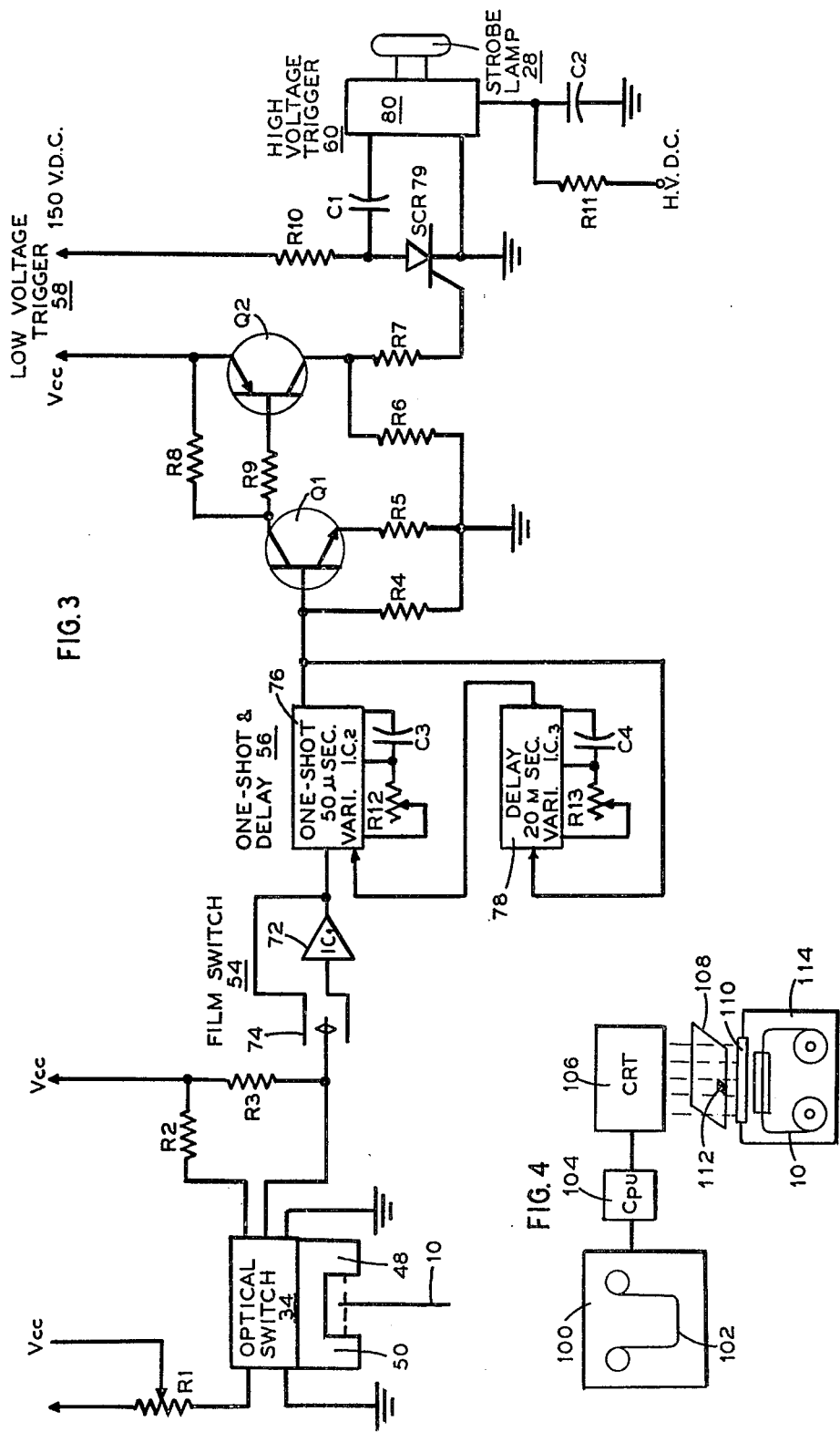

HIGH SPEED MICROFILM SEARCHING SYSTEM

This is a continuation-in-part of Application Ser. No. 441,049, filed Feb. 11, 1974 now U.S. Pat. No. 3,895,865 issued July 22, 1975.

This invention relates to high speed retrieval from microfilm and particularly to a system for uniquely indexing microfilm and retrieving that indexed microfilm.

The use of microfilm is widespread and conventional for purposes of preserving large quantities of information, whether generated by photographing documents or computer generated as digital data to be recorded on the film directly. The conventional method of reading microfilm is to employ a reading apparatus in the form of an optical projector, operated manually or electrically, wherein the film is advanced past a projection mechanism for viewing on a screen. Since reels of microfilm may contain many thousands of frames, the amount of time necessary to retrieve any individual frame becomes inconveniently large when accomplished by direct viewing.

In direct view retireval, the images are advanced past the viewing apparatus at a rate faster than the eye can absorb, thus showing only a blur of light. When the approximate area of retireval is reached, the film must be slowed to a speed enabling the operator to view a reference to determine if the required frame has been reached. Since this process in inexact, starting, slowing and stopping of the film must be repeated several times to provide the proper frame position.

It is therefore the principal object of the invention to provide a novel and unique apparatus for projecting a continuous display of microfilm indexing information while the film is in motion.

It is a further object of the present invention to provide a novel and unique indexing system which will enable a user to locate a desired frame of microfilm while the film is kept in motion.

It is another object of the invention to provide a novel and unique electrically actuatable system for projecting a continuous display of microfilm frame indexing information while the film is moving at relatively high speeds.

It is a still further object of the invention to provide a method of recording information by frames on a spool of microfilm wit a unique identifying frame index recorded on the appropriate frame.

The foregoing objects are realized by a system including an optical sensor responsive to a marker, positioned relative to each frame on a reel of microfilm, for generating a strobe pulse resulting in a strobe flash. The flash is thus synchronized with a frame for illuminating an index number recorded on the frame. In operation, as the desired index code is approached the film movement is slowed so that additional low order digits of the index number become legible. The film is stopped when the approximate frame desired is reached. A fine tuning is then accomplished. The marker is positioned at a constant relationship with respect to the identification indices of the index by means of a locating and recording technique which is accomplished by a programmed computer.

By rapidly transmitting short bursts of light synchronized with the centering of moving frames the changing index takes on the appearance of a movie picture. Thus the strobe serves as a replacement of a more conventional means of alternately blocking and transmitting light to effect animation from a film strip. This concept lends itself especially to the retrieval of data organized systematically on microfilm since in this case the paramount need to search the film at extremely high speeds makes impractical conventional techniques which rely solely on sprocketed film mechanically actuating shutters or prisms. The system being of an electrical optical nature permits the retrieval from film moving at a rate far in excess of that which would be practical with conventional sprocketed movie film. The only constraint on the rate of retrieval under the disclosed system would be the power of the motor moving the film, or if utilized with manual feed, the speed with which one could turn a crank.

The index frame is originally recorded when the data frame is recorded by optically projecting the index code corresponding to the frame or column onto the unexposed film.

The foregoing objects and brief description of the invention will become more apparent from the following more detailed description and appended drawings, wherein:

FIG. 3 is a detailed circuit diagram of the block diagram of FIG. 2;

FIG. 4 is a block diagram of a recording system for recording the indexes on the frames together with correctly located markers and frame data.

Figure 1:
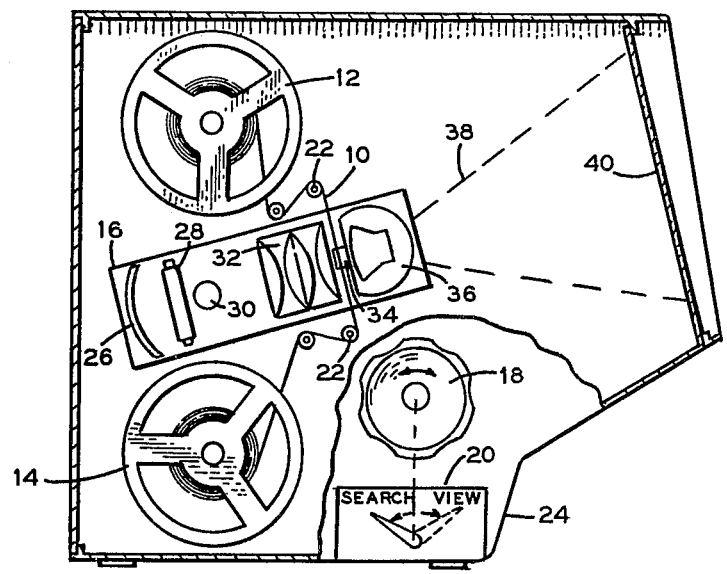
FIG. 1 is a diagrammatic side elevation of a projection apparatus showing the relationship of the film and projection optics.

Referring to FIG. 1, the film 10 is stores in a storage spool or reel 12 and taken up on a take-up spool or reel 14. The film is run through the optical system, illustrated generally as 16, by either manual or motor driven operation. Since motor drive is the preferred mode of operation, the use of the system herein shall be described in conjunction with a motor driven system although it will be understood that the system can be employed with manual feed.

With motor drive, a control knob 18 provides a first portion of the film control means, the second portion of which includes a search/view control 20. The control knob 18 is employed as a forward and reverse variable motor speed control, whereas the search/view control 20 provides a search mode energizing the flash circuitry for searching through indices, and a view mode energizing the projection lamp for viewing the frame data.

The film 10 is entrained over conventional guide rollers 22 and threaded through the optical system 16 which is fixedly mounted to the cabinet 24.

The optical system 16 includes a reflector 26, a strobe lamp 28, a projection lamp 30, a condenser lens 32, an optical switch 34, and a viewing lens 36. The projected image 38 is projected on a mat screen 40.

Figure 2:
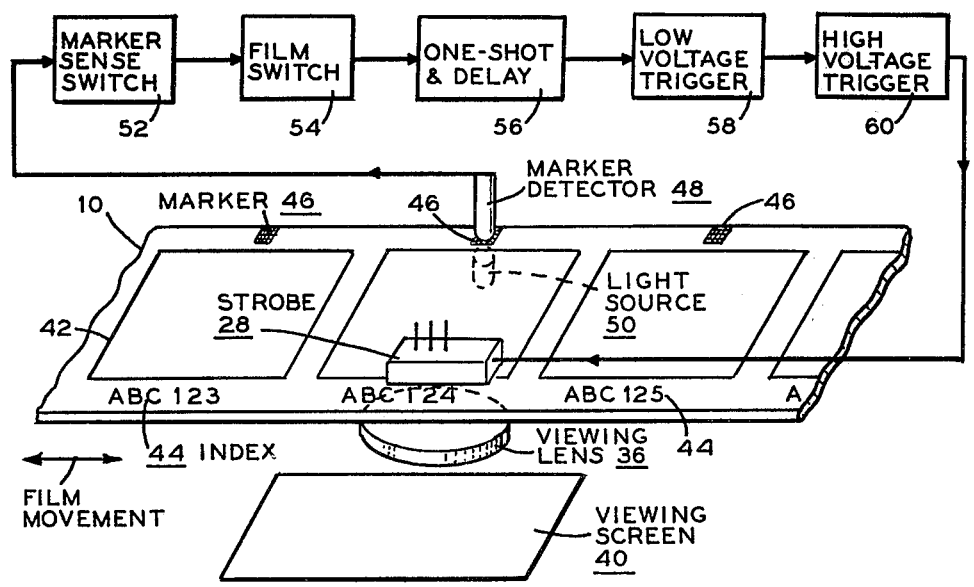
FIG. 2 is a block diagram of the electronic system employed with a pre-recorded indexed frame of a series of frames.

Referring to FIG. 2, the index projection system is illustrated in greater detail. The film 10 is divided into a plurality of frames 42, each including a unique index number 44. It is noted that the index numbers are alpha-numerically assigned, with a units digit variation occurring between frames. It will be understood that the frame index designations may vary and that other indexing schemes may be employed as will be apparent from the following description.

Positioned on an edge of the film, with each frame, is a marker 46. The position of the marker 46 is detected by means of the optical switch 34 (FIG. 1) which includes a marker detector 48 and a light source 50, positioned on respectively opposite sides of the film 10, and a marker sense switch 52. Although shown as a dark marker against a transparent background, it is of course understood that a negative system may be employed, with a transparent marker against a dark background. To enable the system to handle either occurrence, a film switch 54 is provided for selectively inverting the marker sense switch output.

The output of the film switch 54 is coupled to a one-shot and delay circuit 56 which will provide a trigger pulse, in accordance with a minimum delay period, to the low voltage trigger 58. The low voltage trigger 58 is used to drive a high voltage trigger 60, which in turn drives the strobe lamp 28. The marker sense switch 52, the film switch 54, the one-shot and delay circuit 56, and the low and high voltage triggers 58 and 60 comprise the electronic control means 61. Thus, the electronic control means 61 is responsive to a marker 46 to operate the strobe 28 via the optical switch 34 (FIG. 1) which comprises the marker detector 48 and the light source 50.

The strobe lamp 28 is positioned so as to provide maximum light to the index number 44 area, thus projecting the index number 44 through the viewing lens 36 to the viewing screen 40. Since the flash of the strobe 28 will occur in timed relationship to a frame, the repeated projection of the index numbers 44 will give the appearance of a still projection although the frames continue to move at a rapid rate.

The operation of the system is therefore based upon the sequence of frame index projections. At a high rate of movement, each frame index projection will overlay the prior frame index projection and be optically integrated by the eye of the viewer such that the least significant digit or digits will appear blurred. For example, using the index 44, if a film includes 20 frames per foot, and the film is moving at 400 feet per minute, the digit in the most significant digit position, here the character A, will change every 5070 seconds, the next most significant (character B) every 195 seconds, the next most significant (character C) every 6.7 seconds, and the next most significant (1 and every 0.75 seconds. The remaining digits change more rapidly in proportion. It has been found that a change level of about 0.6 seconds is readable by the human eye. Thus, once the first four digit portions are read in accordance with a desired index to be retrieved, the film can begin to be slowed, as by rotation of speed control knob 18. At 50 feet per minute, the fourth digit position (character 1) requires 6 seconds to change, while the fifth digit position requires 0.6 seconds to change, thus becoming readable. At 5 feet per minute, the fifth digit position (character 2) requires 6.0 seconds to change, and the last or least significant digit requires 0.6 seconds to change, thus becoming readable. The film can now be stopped at the desired index, and viewed.

The one shot 56 functions to insure the trigger circuits 58 and 60 get one pulse per marker and that that pulse is uniform with respect to its pulse width and is independent of the speed that the marker may be moving past the optical switch 34. The delay 78 establishes a maximum flash rate. For example, if the delay is set for 20 milliseconds, then a high speeds there will be a 20 millisecond delay between flashes or a maximum flash rate of 50 flashes per second. If the feed rate is 100 frames per second, then every other frame will be flashed. As is evident from the foregoing, flashing every other frame at that speed will not affect the visual resolution of index numbers. At higher film speeds, fewer marker signals are operative to activate the strobe lamp 28 since marker signals which trigger the one shot 76 also activate the delay 78 which in turn inhibits the one shot 76 from being triggered for 20 milliseconds. Thus, the faster the film speed, the more intervening markers there are which do not produce a flash.

It is possible to flash every frame by not using a delay 78 but there is no advantage to flash at a rate faster than 50 frames per second; and by not flashing every frame at a high speed, the life of the strobe is increased.

The marker detector 48, light source 50 and marker sense switch 52 are contained within the optical switch 34 which, as shown in FIGS. 1 and 2, includes a notched portion containing the beam of light between the light source 50 and the marker detector 48 and through which the film 10 passes with an edgewise relationship for marker detection. The sensitivity of the optical switch 34, (FIG. 3) may be adjusted by means of a sensitivity adjusting resistor R1 which is biased by a potential $V_{cc}$. The optical switch 34 may be a commercially available unit consisting of an infra-red light emitting diode activating a photo-transistor across an air spacer gap, together with a Schmitt trigger circuit. When the light beam is interrupted, as by the marker 46, the output of the optical switch 34 changes. Such a unit is commercially available from the HEI Company, Chaska, Minn., as Optical Switch No. OS-591S-060LW.

The film switch 54 consists of an inverter 72, the input to which is controlled by means of switch 74 for positive or negative film. The resistance R2 serves as a biasing resistor for the optical switch 34 to prevent oscillation of optical switch 34 at low speeds. The resistance R3 serves as a load for the optical switch 74.

The one-shot and delay circuit 56 is coupled from the output of the inverter 72 and includes a monostable multivibrator or one shot pulse generator 76 which, as shown, is set at 50 microseconds but which may be variable by means of an adjustable resistor therein. Coupled to the one shot pulse generator 76 is a 20 millisecond delay timer 78, the operation of which is to delay or inhibit refiring of the one shot for the delay period preset by the delay unit 78. Te delay unit 78 may also be adjustable by means of a variable resistance as shown. The 50 microsecond and 20 millisecond time periods, of course, may be varied and are cited as exemplarly only and not intended to be limiting. The output of the one shot pulse generator 76 is fed to a low voltage trigger 58 which, as shown, consists of a conventional two transistor switch and appropriate biasing resistances for applying a trigger potential to the gate electrode of the SCR 79. The firing of the high voltage trigger 60 by the low voltage trigger 58 will couple the previously stored potential on the capacitor C1 into the high voltage trigger circuit 80 for firing the flash tube or stobe lamp 28.

The flash tube or strobe lamp 28 may be a 1CP3 type available from the U.S. Scientific Instruments Co. of Watertown, Mass., and a suitable high voltage trigger circuit 60 for firing the flash tube is disclosed in U.S. Pat. No. 3,355,625. Other suitable triggerable light sources may be used, such as a keyed laser.

The remaining components, by way of example, may have the following component values, it being understood that such values are presented as examplary and not intended to be limiting:

| | | | | | | |
|---|---|---|---|---|---|---|
| $V_{cc}$ | — 5, | $R_7$ | — 100 ohms | $C_1$ | — 0.27 uf | |
| $R_1$ | — 200 ohms | $R_8$ | — 10K ohms | $C_2$ | — 0.5 uf (1000 VDC) | |
| $R_2$ | — 100 ohms | $R_9$ | — 1K ohms | $C_3$ | — 1 uf | |
| $R_3$ | —2.2K ohms | $R_{10}$ | — 1K ohms | $C_4$ | — 25 uf | |
| $R_4$ | — 10K ohms | $R_{11}$ | — 1K ohms | $IC_1$ | — SN7402N | |
| $R_5$ | — 1K ohms | $R_{12}$ | — 1K ohms | $Q_1$ | — TIS92 | |
| $R_3$ | — 10K ohms | $R_{13}$ | — 1K ohms | $Q_2$ | — TIS93 | |
| SCR79 | — 2N4187 | | | | | |
| One-Shot & Delay 56 — SN74121N | | | | | | |
| Delay 78 — SN74121N | | | | | | |

Referring to FIG. 4, a generalized schematic of the manner wherein information is applied to the film is set forth in some detail for computer generated film. As shown, a tape unit 100 is provided with a computer tape 102 containing thereon the electronic digital information to be recorded on the film on a per frame basis together with the associated frame indexes and optically detected marker. The digital information indexes and marker are fed through a central processor unit 104 to the cathode ray tube display 106. Alternatively, the CPU104 can be preset to respond to each frame or column of information applied thereto for internally generating a sequence of index numbers and markers corresponding to those particular frames. The index numbers and markers are recorded on one edge of the film by means of the CRT display 106. The frame information is also generated on the face of CRT display 106 and projected through a mask 108 onto an optical lens arrangement 110. The mask 108 can include a marker image 112 positioned on the mask so as to be perferably located on the opposite or same edge of the film as the index when projected through the optical lens 110. The film is contained inside a suitable exposure device 114 and is fed on a frame by frame basis to be exposed to the images applied from the CRT106. The index and its associated marker should be juxtaposed in such a manner that when the marker causes the strobe to be fired the entire index is displayed within the confines of the viewing screen 40. The use of the mask 108 or marker image 112 need not be done simultaneously with exposure of the data from the computer tape but is done before the film is advanced to the next frame. In order to avoid jitter of the index numbers on the screen, it is necessary that each marker be positioned with respect to its associated index in a constant relationship. This enables the strobe to be fired with regard to each successive index thereby preventing any misregistration in the index overlays, which would occur to the eye as a jitter effect.

Alternatively, markers 46 may be recorded using a bulb positioned adjacent to the unexposed film and operated at the correct time under control of the CPU104.

In the case of filming from paper, the marker and index numbers would be assigned and recorded at the time of exposure of the paper document, or at a later time.

The indexes 44 are computer generated in accordance with known tecniques. In the past markers, such as markers 46, have been used to decrement or increment a counter preset to a given number to cause the film to move that given number of frames from or to the preset number, starting with the frame showing when the counter is preset.

It is novel, however, to use markers in a constant relationship with associated indexes to operate a triggerable light source to display the index when the microfilm is moving, especially at high search speeds and especially when the index is recorded adjacent to a data frame or series of data frames.

Referring to FIG. 4, the CPU transfers data from magnetic tape to film. The indexing technique employed with the film for reading purposes utilizes a sensing mark or marker positioned in a constant relationship with respect to an indexing indicia such as digital numbers or the like recorded on the film. As described above, when the sensing mechanism picks up the marker, a strobe is fired illuminating the indexing number. It is important that the strobe be fired in each frame, with respect to the indexing number, at the same instant with respect to the film position within the frame so that the image will appear constant. Since the sensing mark is always positioned in a constant relationship with respect to the index number, no shutter mechanism or masking techniques are necessary.

Figure 5:
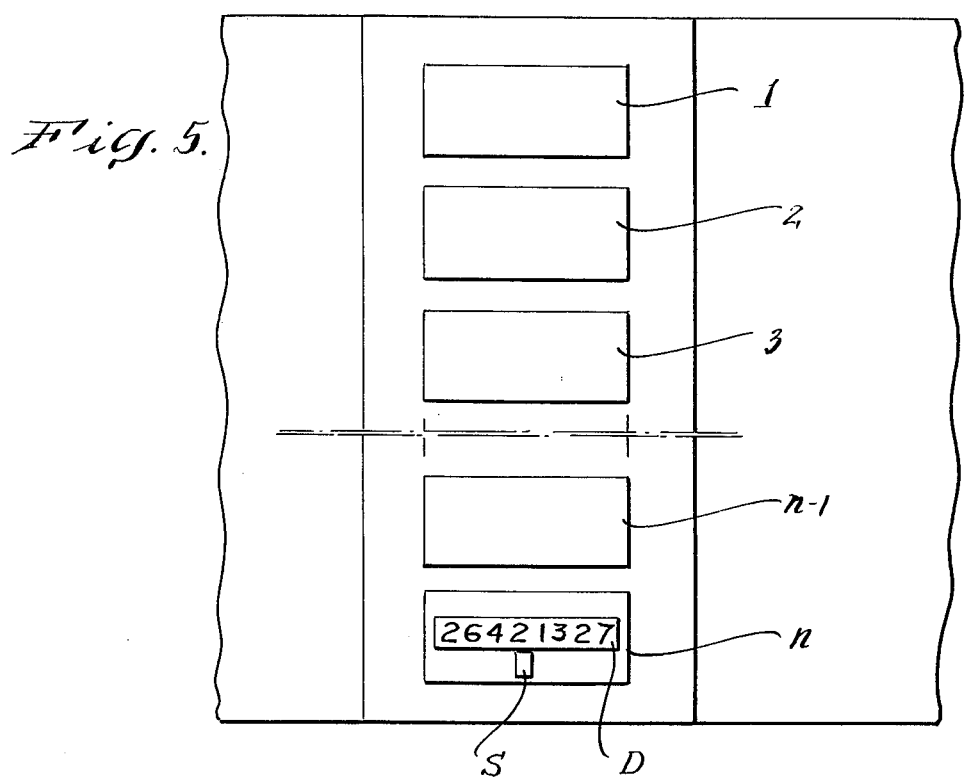
FIG. 5 is preferred format film frame typically inclusive of a plurality of frames representing pages of data and a further indexing frame in accordance with the present invention.

The particular and preferred format of recording employed in accordance with the present invention utilizes a multiple page data recording format. As shown in FIG. 5, a total film frame is typically inclusive of a plurality of frames 1, 2, ... n-1 respresenting pages of data, and a further frame n for indexing. In a typical embodiment, there can be thirteen data frames, and a 14 (n for indexing. The fourteenth frame includes the marker S and the indexing data D which correlates with the thirteen frames of data recorded on the film above the indexing data. With an eight digit indexing number, the marker is conveniently recorded between the fourth and fifth indexing digit. This indexing position of the marker is maintained throughout the film for the entire sequence in order to maintain the constant strobing relationship necessary for viewing the indexing number. As has already been set forth, the result is to present a series of apparently fixed digits in the first three digit positions, with the last five digit positions appearing blurred because of their rapid change relative to the ability of the human eye to integrate the repetitive images. As the progress of the film increases or slows, the lesser or greater number of digits become legible.

Figure 6:
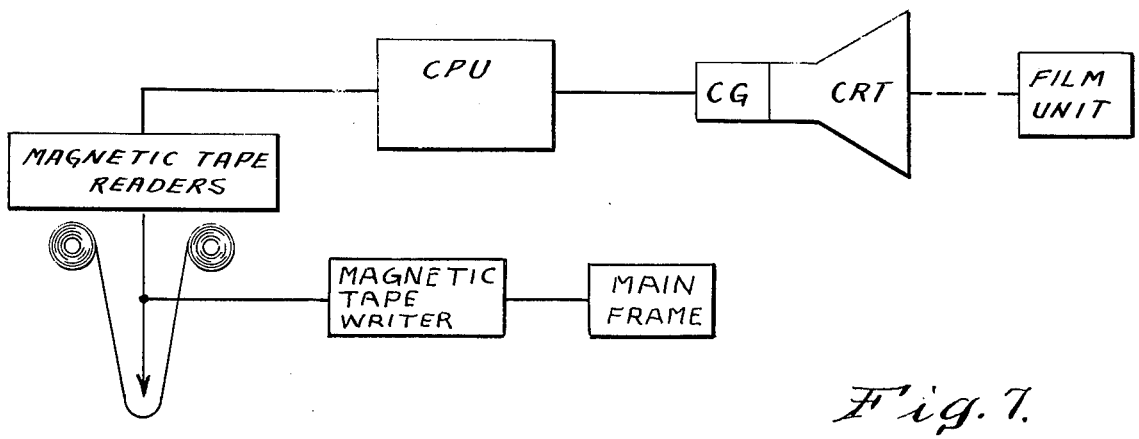
FIG. 6 is a block diagram of the central processor unit (CPU) for recording data marker and indexing number.

The CPU device shown in FIG. 6 provides the mechanism whereby the data marker and indexing number are properly recorded on film. The data is stored on magnetic tape and read off by suitable tape reading mechanisms. The first thirteen data frames are interpreted by the controller portion of the CPU and activate the scanning CRT so as to present suitable corresponding optical images for recording on film. Under program control, the CPU further acts to place the marker on the film between the fourth and fifth index digit. The index and marker are stored on the magnetic tape and read off the tape reading mechanism as if it were the fourteenth data frame. It will be understood that the markers will always be recorded in the same position relative to each index number, although it is merely a matter of preferably design choice to place the marker between the fourth and fifth digit positions.

Figure 7:
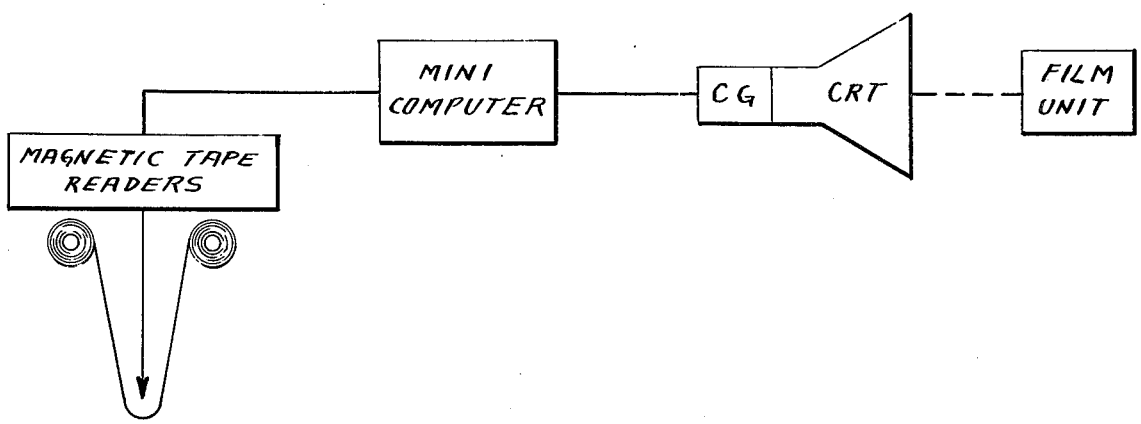
FIG. 7 is a block diagram of a minicomputer index and marker recorder which is an integral part of the COM device.

By way of illustration, the recording of the index and marker can be recorded by means of a minicomputer, which is an integral part of the COM device, as shown in FIG. 7. For the index-marker frame (14, as set forth above) the minicomputer interprets a defined index key from a data page normally the first or last in a column and stores it until it is time to display the 14 frame (N-FIG. 5). At that time the minicomputer takes control and the index and the marker which has been programmed to be located between the fourth and fifth characters of the index are filmed. Summarizing, the minicomputer takes the information from the tape, generates the appropriate index number for filming and, at the appropriate point relative to the position of index numbers, generates the marker for filming. The marker and index numbers are preferably recorded as a pattern of asterisks which are sufficiently dense to present a solid or clear appearing reference area, optically detectable by a photo sensor or the like. An example of a minicomputer and printing-filming unit which can be used is the CalComp Model 2100 COM printer, and the CalComp 925 Series Controller with magnetic tape unit, both available from the California Computer Products Company, Anaheim, CA.

Alternatively, and preferably, the entire sequence can be effected by means of a suitably programmed general purpose computer (CPU) interfaced with a CRT and film frame exposure unit. The computer is programmed in accordance with well known programming techniques to derive the frame marker and index data from the storage tape and convert it into a film record, as is exemplified by the sample program attached hereto as Appendix A. The sample program is compatible with IBM Computer Models 360 or 370, available from the International Business Machines Corporation, Armonk, N.Y., and results in a magnetic tape, containing data pages, indexes, and with properly positioned marker pulses as shownn in FIG. 5. Obviously, other programs and other computers can be employed within the state of the art in accordance with the spirit and scope of the present invention. The magnetic tape is then recorded by a COM device which transcribes the data, the index numbers and markers, on microfilm. An example of a COM device is the KOM-90, COM recorder available from Eastman Kodak, Inc., Rochester, N.Y.

The system, as designed, is compatible with any CRT/COM unit, such as the SEACO 401, manufactured by Seaco Computer Display, Inc. of Garland, TEX. The film frame exposure unit is a conventional 42× reduction, 105MM film size available from most film manufacturers, but could be 24×, 48× or 72× or 16MM film at various reductions.

In the microfilm projection apparatus shown in FIG. 1, the indexes are displayed on viewing screen 40. However, the indexes could be displayed on a separate screen of an attachment to a conventional microfilm viewer. In that embodiment of the invention the film 10 is fed outside of the microfilm viewer housing, through the attachment and then back into the housing to the optical system 16. The attachment would essentially comprise all of the apparatus of FIG. 2 except that the index viewing screen would be mounted on the attachment. When the indexes are originally recorded, an adjustment would be made for the number of frames between the frame with the index being displayed on the attachment screen and the frame being projected on the viewing screen 40 so that the index being displayed on the attachment screen corresponded with the frame being displayed on the viewing screen 40.

Alternatively, the apparatus of FIG. 2 could be made separate from the microfilm viewer with the intent of converting an existing viewer to incorporate the invention. In that case the indexes would be displayed on the microfilm viewing screen, and the existing optical system or a separate index display optical system could be used.

Thus, what has been described is a novel and unique electronic system for displaying a plurality of continuously moving frames onto a single screen wherein a rapidly changing index number allows operator retrieval at high speeds.

What is claimed is:

1. A system for recording a marker and an index together with data on each of a plurality of frames of a microfilm, wherein the data is stored as digital signals on a tape, comprising:
    a. visual display means for displaying the data on a screen;
    b. computer means responsive to the data on the tape for converting the data to human readable characters for display on the screen, and for generating a human readable index for display on the screen, for each of the frames on which data is to be optically recorded;
    c. unexposed film source means positioned adjacent the screen of said visual display means for optically recording the data in a plurality of frames;
    d. marker recording means; and
    e. control means for recording on a given frame, the data, a marker and an index so that the marker is always recorded in a predetermined position on the frame with respect to the index on that frame.

2. The system of claim 1 wherein each marker is recorded adjacent one edge of the frame and the associated index is recorded adjacent the opposite edge of the frame.

3. The system of claim 2 wherein each marker is positioned under the index on each frame.

4. The sytem of claim 3 wherein the data, a marker and an index are recorded on a given frame.

5. A method of transferring data from magnetic tape to optical film with a marked indicia index for retrieval of said data comprising the steps of exposing a plurality of groups of data frames, each of said groups corresponding to a single film indexing position, generating a series of index indicia, each applicable to one of said groups, applying each of said index indicia to one frame of each of said groups, generating a series of sensing markers, and applying one of said sensing marker to each of said one of said frames containing said index indicia at the same predetermined position relative to said index indicia in each of said one of said frames.

6. The method of claim 5 wherein each of said index indicia are applied as digital numbers.

7. The method of claim 5 wherein each of said index indicia are applied as a plurality of asterisks closely positioned for optical.

8. The method of claim 5 wherein each of said sensing markers are applied as a plurality of asterisks closely positioned for optical sensing.

9. A metod of transferring data from magnetic tape to optical film with a marked indicia index for retrieval of said data comprising the steps of exposing a plurality of groups of data frames, each of said groups corresponding to a single film indexing position, generating a series of index indicia, each applicable to one of said groups, applying each of said index indicia to one frame of each of said groups, counting each of said index indicia during application thereof, generating a series of sensing markers, and applying one of said sensing marker to each of said one of said frames containing said index indicia at the same predetermined position relative to said index indicia in each of said one of said frames.

10. The method of claim 9 wherein each of said index indicia are applied as digital numbers.

11. The method of claim 9 wherein each of said index indicia are applied as a plurality of asterisks closely positioned for optical sensing.

12. The method of claim 9 wherein each of said sensing markers are applied as a plurality of asterisks closely positioned for optical sensing.

* * * * *